March 2, 1971 P. H. JAMES 3,566,499
METHOD OF MOUNTING SHEET MATERIAL
Filed Aug. 6, 1968 4 Sheets-Sheet 1

FIG.I.

March 2, 1971   P. H. JAMES   3,566,499
METHOD OF MOUNTING SHEET MATERIAL
Filed Aug. 6, 1968   4 Sheets-Sheet 3
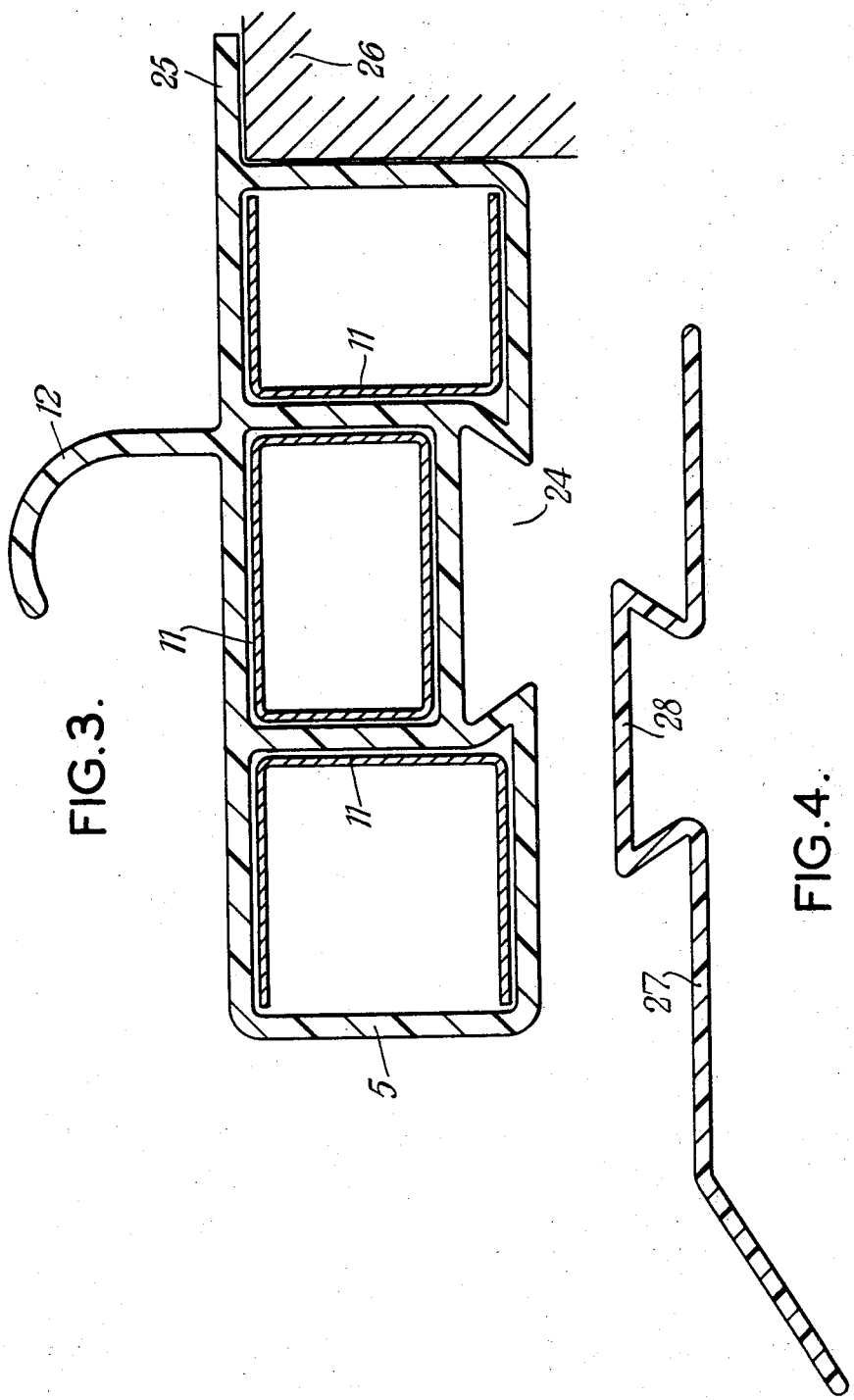

3,566,499
METHOD OF MOUNTING SHEET MATERIAL
Peter Henry James, 9 Adamsrill Road,
London, SE. 26, England
Filed Aug. 6, 1968, Ser. No. 750,520
Claims priority, application Great Britain, Aug. 15, 1967,
37,560/67; Nov. 15, 1967, 52,088/67
Int. Cl. B23p *17/00, 11/02, 19/00*
U.S. Cl. 29—155             11 Claims

ABSTRACT OF THE DISCLOSURE

A method of glazing, or mounting other sheet materials, which employs a substantially rigid polyvinyl chloride frame having a projecting resilient rib. The glass or other sheet material is assembled to a coupling member and mechanically pressed or clamped against the free edge of the rib with the aid of the clamping member, the clamping member being secured to the other end of the rib by a bolt. A narrow free edge region of the glass or other sheet material projects beyond the rib.

---

Figure 1:
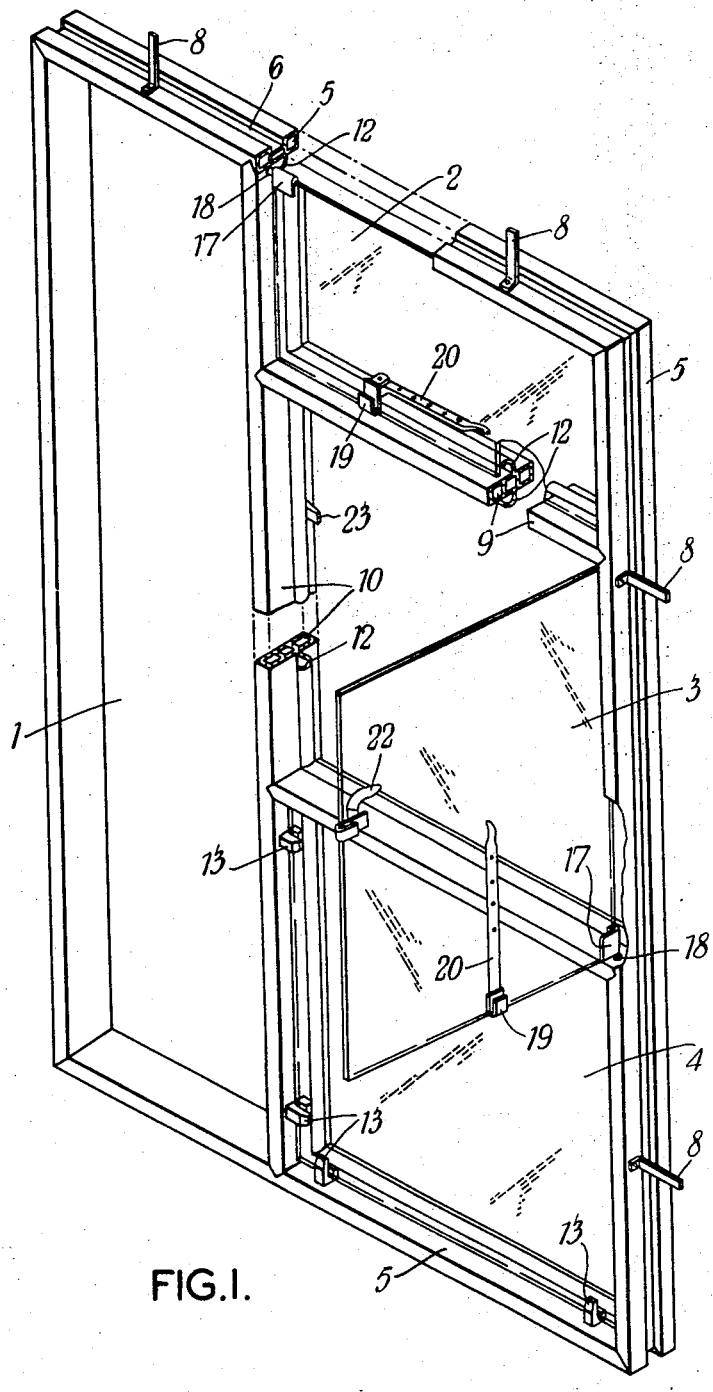

This invention relates to methods of mounting sheet material and is in particular, but not exclusively, concerned with methods of glazing.

Proposals have been made for securing panes of glass and the like in shop windows and other frames with the aid of various clips, clamps, pads and so on. These known proposals are somewhat complicated and expensive to employ and, although they are probably effective in use, they merely provide basically similar alternatives to the conventional methods of glazing which generally involve seating the edges of panes of glass in correspondingly shaped recesses of substantially rigid frames and subsequently partially embedding said edges in materials such as putty which set to provide a substantially rigid mounting and more or less efficient weather-proof seal.

There is no technically valid reason for the provision of a frame to surround the edges of a pane of glass which serves as a fixed or openable window. Conventional frames of this kind are, in fact, disadvantageous since lightweight ones are maintained in their correct configuration by the glass itself rather than affording any effective support for the glass and thus add unnecessarily to the costs of glazing whilst heavyweight frames are quite expensive and will not yield slightly in the manner which is required to allow the glass to flex, rather than break, when it is subjected to strong winds or to shock waves produced by explosions, supersonic aircraft and other causes. The present invention therefore proposes, as one of its objects, to provide a method of glazing which gives a good weatherproof seal but in which the edges of the panes of glass do not need to be received, and sealed, into a shaped recess and can be left entirely free of surrounding frame or other members throughout all, or large parts, of their lengths. Experimental work has shown that installations glazed by methods in accordance with the invention have a safety factor sufficient to give a high degree of protection against glass breakage under the strong wind or shock wave conditions mentioned above. A further object of the invention is the provision of windows and the like that have frames which require less maintenance than conventional frames or which can be substantially maintenance-free provided that appropriate materials are chosen for their construction.

According to one aspect of the invention, there is provided a method of mounting sheet material comprising the provision of a substantially rigid frame and a resilient rib projecting from the frame, and the step of pressing one side of a sheet of material into substantially sealing engagement with the free edge of said rib.

It is preferred that the resilient rib should, when seen in cross-section, have a curved or crooked elongated shape. It is also preferred that where one side of the sheet material is pressed into substantially sealing engagement with the free edge of the rib, it should be pressed in a direction which is inclined to the plane of the rib at or near its junction with the frame. It is particularly preferred so to press one side of the sheet material in a direction which is perpendicular to the plane of the rib at or near its junction with the frame.

Figure 2:
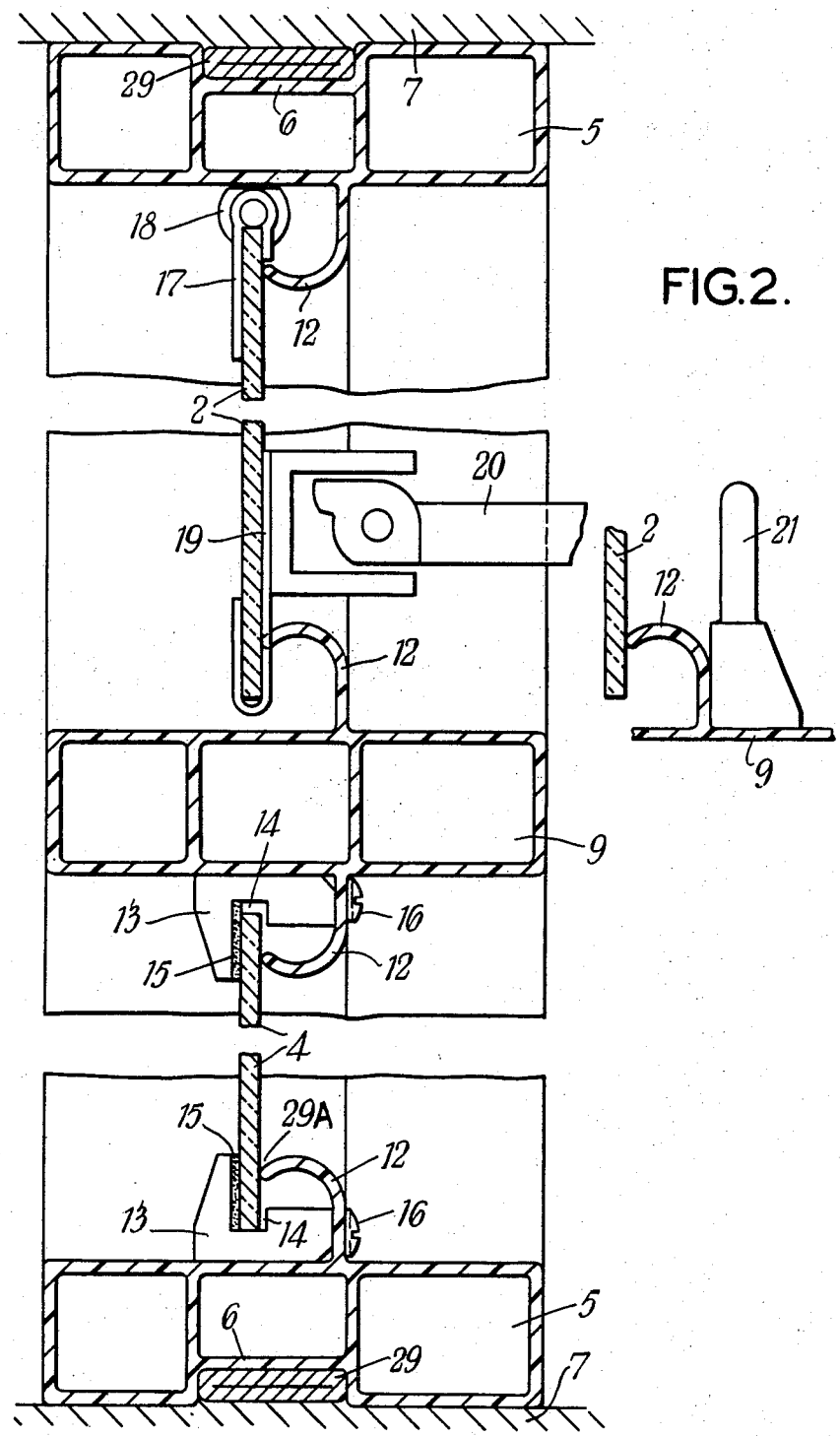
Figure 5:
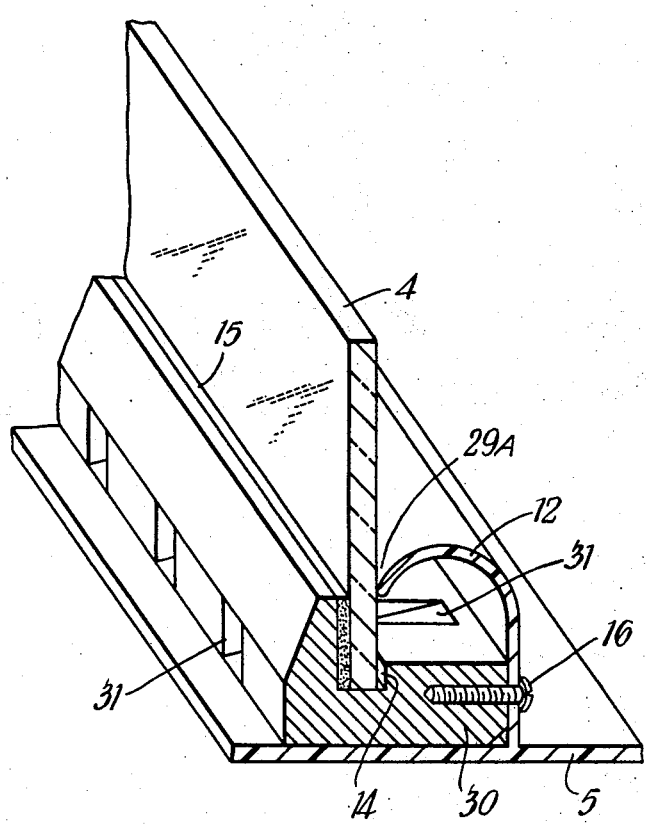

For a better understanding of the invention, and to show how the same may be carried into effect, reference will now be made, by way of example, to the accompanying drawings, in which:

FIG. 1 is a part-sectional perspective view of a frame glazed by a method in accordance with the invention, FIG. 2 is a sectional elevation showing fixed and openable windows that are glazed by a method in accordance with the invention, FIG. 3 is a sectional elevation showing a cross-section of an alternative form of frame employed in a method in accordance with the invention, FIG. 4 is a cross-section of a sill member or sill frame which can be employed in conjunction with the frame of FIG. 3, and FIG. 5 is a scrap perspective view illustrating the use of an alternative form of clamping member.

Referring first to FIG. 1 of the drawings, a frame is illustrated having a door opening 1, an uppermost top-hung vent 2, a central side-hung window 3 and a lowermost fixed window 4. The frame is formed from polyvinyl chloride by extrusion of the latter in continuous hollow sections. This material does not need painting and is substantially maintenance-free. The sections are cut into the required lengths and are joined together to make a frame such as that illustrated in FIG. 1 of the drawings. The L-shaped junctions between various sections of the frame preferably take the form of mitre joints whereas the T-shaped and any X-shaped junctions preferably take the form of notched joints. It will be seen from both FIGS. 1 and 2 of the drawings that the various sections of the frames each have three longitudinally extending hollow compartments each of which is of rectangular cross-section. In the cases of peripheral frame sections, such as the similar frame sections 5 in both FIGS. 1 and 2 of the drawings, the centre one of the three hollow compartments has smaller dimensions than the other two compartments so as to form a groove 6 which co-operates with mortar or other surrounding building material 7 (FIG. 2) in retaining the whole frame in its appointed position. The frame is also provided, for the same purpose, with conventional ties 8 that are embedded in the surrounding building materials during installation of the frames.

In the cases of non-peripheral frame sections, such as the similar horizontal transoms in FIGS. 1 and 2 of the drawings and the vertical mullion 10 in FIG. 1 of the drawings, the central hollow compartment does not need to be of reduced dimensions since the transom 9 or mullion 10 of which it forms a part does not contact the surrounding mortar or other building material 7. Where a peripheral groove 6 is provided, a neoprene sealing tube 29 (FIG. 2) may be compressed between the base of the groove 6 and the surrounding mortar or other building material 7 or, alternatively, the hollow frame sections may be extruded in a cross-sectional shape which includes a deep groove (not illustrated) intended to act, in known manner, as a so-called capillary break.

It will be appreciated that extruded polyvinyl chloride is a material having a considerable degree of rigidity but that the rigidity cannot be relied upon where frame members such as those which have been described have to bear any appreciable weights. Accordingly, it is preferred, but is not absolutely essential, to increase the rigidity of the various frame sections by the use of stiffening members 11 of which three are shown in FIG. 3 of the drawings. The stiffening members 11 may take the form of rectangular cross-section tubes or channel-shaped pieces made, for example, of 20 gauge mild steel, or alternatively, they may take the form of wooden beams made from chip board or the like.

In accordance with an important feature of the invention, the various frame sections such as 5, 9 and 10 each include an integrally formed poyvinyl chloride rib 12 that projects from the frame of which it forms a part and whose major portion is of curved or crooked configuration. As can be seen in respect of the fixed window 4 in both FIGS. 1 and 2 of the drawings, a conventional rectangular pane of glass has one of its sides pressed into engagement with the free edge of the rib 12 with the aid of eight clamping members 13, that is to say, two clamping members 13 in respect of each of the four edges of the pane of glass affording the fixed window 4. Each clamping member 13 is of simple formation and includes a metal (such as aluminium alloy) or rigid synthetic plastic body formed with a recess 14 at one side of which a neoprene or other rot-resistant soft pad 15 is provided. The body of each clamp 13 is formed with a screw-threaded bore which receives the correspondingly screw-threaded shank of a small bolt 16. It will be evident from FIG. 2 of the drawings that the shanks of the bolts 16 are entered through holes formed in the inner flat planar portions of the ribs 12, the heads of the bolts 16 being located at the opposite sides of said ribs from the bodies of the clamping members 13. Upon tightening one of the bolts 16, the body of the clamping member 13 concerned will be drawn towards the rib 12 and the pad 15 located at one side of the pane of glass will press the opposite side of that pane into substantially sealing engagement with the free edge of the resilient rib 12. The lowermost edge of the pane of glass is supported by the bases of the recesses 14 of the corresponding two clamping members 13 during installation of the pane. However, it will be seen clearly from FIG. 1 of the drawings that all four edges of the pane of glass of the fixed window 4 remain free of surrounding frame parts apart from the very small lengths thereof that are engaged by the eight clamping members 13. It will be realised that, where very large fixed windows are involved, it is desirable to employ more than eight clamping members 13 in respect of each large pane of glass.

It will be noted from the drawings that the horizontal transoms 9 have ribs 12 at both their upper and lower sides, each rib 12 co-operating with a corresponding fixed or openable vent or window. The openable vents and windows 2 and 3 take the form of sheets of glass that do not have their own surrounding frames but that are provided merely with hinge and catch fittings. The upper top-hung openable vent 2 has hinge pin brackets 17 bonded to it with the aid of a material which is resistant to the action of both ultra-violet light and ozone. Suitable materials would be the commercially available polysiloxane based elastomeric adhesive known as silicone rubber or epoxide (epoxy) and related resins. If, as will usually be the case, the bracket 17 itself is formed from metal or from a synthetic plastics material, then it is first necessary to coat the surfaces of the bracket 17 that will contact the glass with a commercially available silicone priming compound before the silicone rubber adhesive is used. Hinge pin sockets 18 are provided at the upper ends of the peripheral frame section 5 and mullion 10 which flank the vent 2 and the lowermost edge of the pane of glass affording said vent is provided with a stay or catch clip 19 carrying a more or less conventional stay or catch arm 20. The stay or catch clip 19 is, of course, secured to the pane of glass in the same way as the hinge pin brackets 17. A peg 21 (FIG. 2) for co-operation with the holes in the arm 20 is secured to the transom 9 alongside the corresponding rib 12, the fixing preferably being effected by riveting or welding the peg 21 to one of the mild steel stiffening members 11 that is located internally of the underlying transom 9 or by using wood screws to fasten the pin to a wooden stiffening member 11 when the latter is employed. It will be noted that, in order to maintain a substantial seal when the vent 2 is closed, that part of the compressed rib 12 which bears against the stay or catch clip 19 at such time is preferably recessed to a depth equal to the thickness of the clip.

The openable side-hung window 3 is similarly mounted with the aid of vertical hinge pins but, in this case, a catch 22 is connected to the edge of the pane of glass for co-operation with a projection 23 to retain the window 3 in its closed position.

FIG. 3 of the drawings illustrates an alternative form of peripheral frame section 5 in which the previously described groove 6 is replaced by a groove 24 of dovetailed cross-section. This groove 24 increases the efficiency of the bond between the section 5 and the surrounding mortar or other building material 7 and, once again, is intended to receive the longitudinally-extending deformable sealing tube 29 (FIG. 2) that is formed from neoprene or other rot-resistant material. That one of the three hollow compartments of the section 5 which is intended to be innermost, with respect to the building of which the section forms a part, is of reduced size compared with the previously described section 5 but is formed with a lip 25 arranged to overlap a window board or the like 26 by a distance of about ½" (12½ mms.). The lip 25 conceals the unsightly gaps which sometimes occur as a result of settling, creepage and the like after a building has been finished. A frame which includes peripheral frame sections 5 of the kind shown in FIG. 3 of the drawings is particularly suitable for co-operation with a sill section 27 such as that shown in cross-section in FIG. 4. The sill section 27 includes a dovetailed projection 28 shaped to co-operate with the dovetailed groove 24. The section 27 may be made from rigid synthetic plastics materials such as those known by the name A.B.S. copolymers (i.e. copolymers of acrylonitrile, butadiene and styrene). The sill section 27 may be extended to form a rectangular frame which is extremely useful when the frames that have previously been described are installed in tile hung or ship-lap boarded walls or the like since it will be realised that the sill portion of the section 27 will then conceal the openings that are left at the ends of the tiles, ship-lap boards or the like. It is also desirable to use a sill section or frame 27 where very cold climatic conditions are met with since the section or frame 27 protects the polyvinyl chloride from mechanical shocks which might fracture it at very low temperatures.

In accordance with a second aspect of the invention, fixed windows, such as the window 4, can be installed without the use of the clamping members 13. An elastomeric adhesive is, instead, employed to secure the pane of glass directly to the free edge of the rib 12. It is preferred to employ the commercially available polysiloxane based elastomeric adhesive which is known as silicone rubber. This material is completely resistant to the action of ultra-violet light and ozone and is unaffected by all of the solvents with which it would be likely to come into contact during normal use. Silicone rubber is quite stable between temperatures of $-60°$ C. and $250°$ C. and it has been estimated that it has a useful life of at least 50 years. Although somewhat expensive, silicone rubber is economic in use since only a very thin continuous or discontinuous ribbon of it is required to effect a strong sealing bond between the glass and the rib 12, no mixing or the like being required to effect curing since the material cures quite quickly when exposed to water vapour. The water vapour content of the atmosphere is usually sufficient to effect substantially complete curing within a time of about 2 hours. Alternatively, a "two-pack" silicon elastomer may be used, curing being effected by a catalyst. As soon as the curing has been completed, a sharp-bladed tool can be employed to cut away any excess adhesive at either side of the rib 12 to which the glass is secured. It is noted once again that silicon rubber will adhere very well to glass without any treatment of the latter but that it will not adhere properly to polyvinyl chloride and a number of other materials unless said materials are first treated with a commercially available primer containing a silicone compound. This primer is, accordingly, used to coat the rib 12 before the pane of glass is stuck to it.

It will be appreciated that it is easiest to stick the pane of glass to the rib 12 whilst the frame is occupying a substantially horizontal position since there is no need for any auxiliary support of the glass under these circumstances. However, the glass may be temporarily supported in a vertical or substantially vertical position whilst the elastomeric adhesive is curing. If the rib 12 is formed with the primary intention of co-operating with an elastomeric adhesive, it is preferred that the free edge of said rib should have a bead, key-groove or the like to assist in keying the elastomeric adhesive thereto but this is by no means essential. As in the case when the clamping members 13 are used, the free edge region of the pane of glass preferably overlaps the rib 12 by about ¼" (6 mms.) all round and it will be readily understood that the edge region of the pane of glass is then entirely free of contact with any other surrounding frame portions or the like although, clearly, a frame member may be provided to mask the edge region of the pane of glass if this is found to be desirable for any particular purpose. The use of an elastomeric adhesive to mount the panes of glass of fixed windows is very advantageous but it will be realised that it is not suitable for frameless openable windows such as the vent 2 and side-hung window 3 that have previously been described.

It will be appreciated that the invention lends itself readily to double and multiple glazing. A frame of the kind which has been described may have two or more relatively spaced and substantially parallel ribs 12 and corresponding panes of glass are then clamped or stuck, to the free edges of the two or more ribs 12 in parallel and relatively spaced relationship. The problems of condensation between the two or more panes of glass may be dealt with in any of the ways which are normally employed to overcome that problem. It is also noted that the invention is not limited to use with windows. It will be evident without further description that the panes of glass for glass doors, skylights, internal glass partitions and so on can also be mounted by the methods which have been described. Sheets of other materials, such as hardboard, perspex and so on, may also be mounted by the methods which have been described.

It is believed that the use of glazing methods in accordance with the invention can result in a considerable reduction in the cost of glazing a new house, factory, office or other building and the methods are also very useful in modernising glazing installations in older dwelling houses and other buildings. It will be noted that the methods of mounting glass and other sheet materials that have been described are also useful with buildings and other structures such as greenhouses, loggias, conservatories, cold frames, garden sheds, chalets, portable buildings, garages and internal partitions. Moreover, it is pointed out that, whilst the invention has been presented as aplicable to glass and other sheet materials, shutters and louvres formed from synthetic plastics and other light-weight materials could equally well have their edge regions connected to a frame of the kind which has been described by a method in accordance with the invention. Accordingly, for the purposes of the present specification, the term "sheet material" is to be interpreted as including shutters, louvres and the like within its scope. It is also noted that, whilst it is greatly preferred to form the ribs 12 integrally with the frame sections 5, 9, 10 and so on, it is within the scope of the invention to form the ribs 12 separately and to connect them to the remainders of the frames in any convenient known way. Whilst polyvinyl chloride and other similar synthetic plastics materials are preferred for the formation of the frames and their ribs 12, it is noted that other materials, such as weather-proofed paper pulp and metals in strip form, can equally well be employed provided that they have sufficient resiliency to allow the ribs 12 to come into substantially sealing relationship with the glass or other sheet material.

It will be seen from FIG. 2 of the drawings that a recess 29A is formed between the fixed window 4 and the lower rib 12 corresponding thereto. Condensation on the glass of the window 4 will eventually collect in the recess 29A and can be expelled to the exterior of the frame merely by pushing a small wedge (not shown) or other article downwardly into the recess 29A between the rib 12 and the glass for a short time to temporarily break the seal and allow gravity to remove the unwanted water. When an elastomeric adhesive is used in place of the clamping members 13, it is only necessary to ensure that the ribbon of adhesive is discontinuous along the free edge of the curved rib 12 which borders the recess 29A. The wedge or other article is then pushed through one of the gaps in the ribbon of adhesive.

It may sometimes be desirable for safety reasons (to ensure that an open window that has been glazed by a method in accordance with the invention is entirely visible) to surround the edges of the pane of glass affording the window with a plain or coloured synthetic plastics edging strip of U-shaped cross-section. This strip may be stuck in position using one of the previously mentioned adhesives and it is emphasised that it does not in any way act as a frame and does not interfere with the seal between the rib 12 and the glass when the window is closed because it is located on the edge of the glass located beyond the rib 12 which makes its seal with the flat side of the glass. When this edging strip is used, any neighbouring fixed windows 4 may be pressed against the rib 12 with the aid of a clamping member 30 (FIG. 5) which is substantially continuous throughout the length of each edge of the pane of glass. This is purely for aesthetic reasons to avoid a clash in appearance with the openable windows having the edging strips. To ensure that drainage of condensation to the exterior of the frame is possible in the manner previously described, the clamping members 30 are formed at frequent intervals with openings 31 through which water can pass under the action of gravity. The small bolts 16 are provided at regular intervals along the clamping members 30.

I claim:

1. A method of mounting sheet material utilizing a substantially rigid frame, a clamping member, and a resilient curved rib projecting from the frame and of a configuration curving towards a sheet of material when said sheet of material is mounted in said frame, comprising the steps of assembling a sheet of material to said clamping member, pressing one side of said sheet of material into engagement with the free edge of the curved rib with the aid of said clamping member and securing said sheet of material in engagement with said free edge of said rib by securing the other edge of said curved rib to said clamping member.

2. A method as claimed in claim 1 wherein the substantially rigid frame is formed from a synthetic plastics material.

3. A method as claimed in claim 1 wherein the resilient rib is integral with the subtsantially rigid frame.

4. A method as claimed in claim 1 wherein the sheet material is glass.

5. A method as claimed in claim 1 wherein the substantially rigid frame is provided with at least one stiffening member extending along the length of at least one of the frame sections.

6. A method as claimed in claim 1, wherein the frame is provided with at least one openable window in the form of a pane of glass that does not have its own surrounding frame, said pane of glass being provided with at least one fastening adapted to retain it in a closed position in which it bears against the free edge of said rib in substantially sealing relationship.

7. A method as claimed in claim 1, wherein the sheet material is pressed against the rib by at least one clamping member that includes a pad arranged to bear against the side of the sheet material opposite to the side contacting the rib.

8. A method as claimed in claim 7, wherein the clamping member(s) include(s) a screw whose shank is entered through a planar portion of the rib, the head of said screw being located at the opposite side of said planar portion from the body of the clamping member.

9. A method as claimed in claim 1 wherein the rib, as viewed in cross-section, is of curved elongated shape.

10. A method as claimed in claim 1 wherein the sheet material is pressed into engagement with the rib in a direction which is inclined to the plane of the rib in the region of the junction of the rib with the frame.

11. A method as claimed in claim 4, wherein at least two panes of glass are mounted in parallel and relatively spaced relationship.

References Cited

UNITED STATES PATENTS

| | | | |
|---|---|---|---|
| 2,751,109 | 6/1956 | Moore | 220—80 |
| 3,312,028 | 4/1967 | Schroger | 29—155 |
| 3,430,903 | 4/1969 | Mathes | 29—526X |

THOMAS H. EAGER, Primary Examiner

U.S. Cl. X.R.

29—450, 526